United States Patent [19]
Wirth et al.

[11] Patent Number: 5,642,706
[45] Date of Patent: Jul. 1, 1997

[54] INTERNAL COMBUSTION ENGINE WITH SPARK IGNITION

[75] Inventors: Martin Wirth; Walter Piock, both of Hitzendorf, Austria

[73] Assignee: AVL Gesellschaft Für Verbrennungskraftmaschinen Und Messtechnik M.B.H. Prof.Dr.Dr.h.c. Hans List, Graz, Austria

[21] Appl. No.: 641,751

[22] Filed: May 2, 1996

[30] Foreign Application Priority Data

May 3, 1995 [AT] Austria ................................ 757/95

[51] Int. Cl.[6] .................................................... F02B 5/00
[52] U.S. Cl. ........................................................ 123/305
[58] Field of Search ..................................... 123/305, 276, 123/308, 432, 260

[56] References Cited

U.S. PATENT DOCUMENTS

| | | | |
|---|---|---|---|
| 4,790,270 | 12/1988 | Mc Kay et al. | 123/73 C |
| 4,920,937 | 5/1990 | Sasaki et al. | 123/305 |
| 5,170,759 | 12/1992 | Ito | 123/276 |
| 5,215,053 | 6/1993 | Ito | 123/276 |
| 5,233,956 | 8/1993 | Ueda et al. | 123/302 |
| 5,259,348 | 11/1993 | Kobayashi et al. | 123/260 |
| 5,392,745 | 2/1995 | Beck | 123/295 |

FOREIGN PATENT DOCUMENTS

| | | |
|---|---|---|
| 0328602 | 6/1992 | European Pat. Off. . |
| 0598941 | 11/1992 | European Pat. Off. . |

OTHER PUBLICATIONS

A. Scussel, "The Ford PROCO Engine Update" in SAE 780699, Aug. 7–10, 1978, pp. 1–39.

International Pub. No. WO 88/08082 to P. W. Ragg et al., entitled "Pressurizing a Gas Injection Type Fuel Injection System," dated Oct. 20, 1988.

M. G. Kingston et al., "Nebula Combustion System For Lean Burn Spark Ignited Gas Engines" in SAE 890211, Feb. 27—Mar. 3, 1989, pp. 1–12.

Primary Examiner—Raymond A. Nelli
Attorney, Agent, or Firm—Watson Cole Stevens Davis, P.L.L.C.

[57] ABSTRACT

A combustion chamber formed by a recess in the piston of an internal combustion engine is divided by restrictions into two or more partial chambers. The ratio between the minimum distance in the area of the restrictions and the maximum distance in concave areas of the wall of the combustion chamber, as measured from the axis of the combustion chamber, is between 0.2 and 0.5. In the area of the minimum distance downstream of the restriction, the wall of each partial chamber is inclined relative to the axis of the combustion chamber, the inclination decreasing continuously in downstream direction. To achieve extremely lean operation with low exhaust emissions, the fuel injection device is located in a position eccentric to the center of the combustion chamber, and the ignition device is located approximately in the center of the combustion chamber. The restrictions of the piston recess are provided with guide faces located approximately parallel to the axis of the combustion chamber and directed towards the center of the combustion chamber, the smallest distance of these guide faces from the center of the combustion chamber being 0–0.2 times the piston diameter.

12 Claims, 7 Drawing Sheets

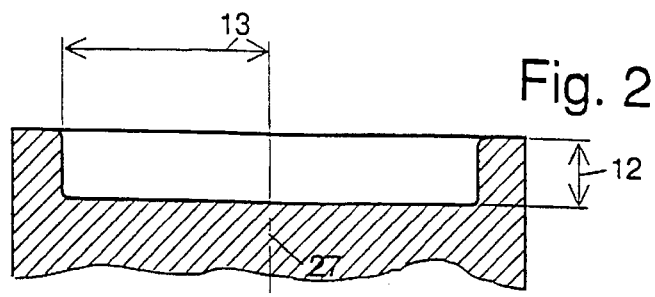
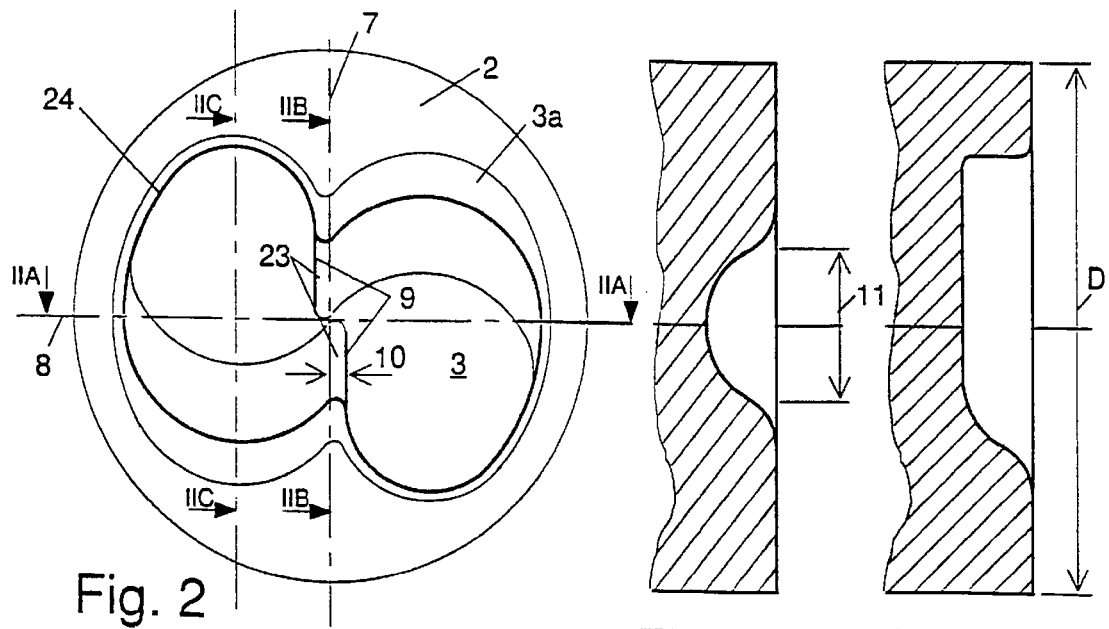
Fig. 2    Fig. 2b    Fig. 2c
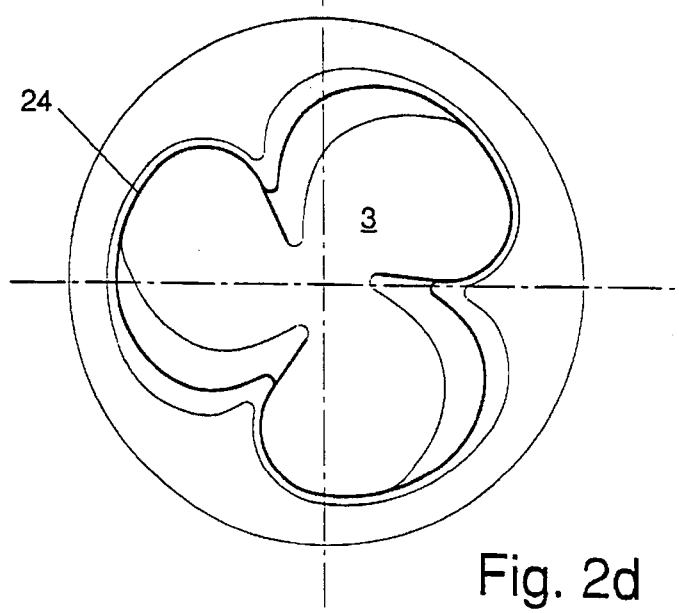
Fig. 2d

INTERNAL COMBUSTION ENGINE WITH SPARK IGNITION

BACKGROUND OF THE INVENTION

The present invention relates to an internal combustion engine with spark ignition and one or more reciprocating pistons, with at least one fuel delivery device per cylinder for direct introduction of fuel into the combustion chamber substantially located in the piston, which combustion chamber is divided into two or more partial chambers by restrictions extending to the bottom of the combustion chamber, the said partial chambers being shaped asymmetrically as seen from above and arranged rotation-symmetrically to an axis passing through the centre of the combustion chamber and being parallel to the longitudinal axis of the piston, with a minimum distance in the restricted areas of the wall of the combustion chamber and a maximum distance in concave-shaped areas of the wall of the combustion chamber, departing from the axis of the combustion chamber and measured in a cutting plane directly below the top of the piston, the ratio of minimum distance to maximum distance being at least 0.2 and at most 0.5, and the wall of each partial combustion chamber being inclined relative to the longitudinal axis of the piston in the area of the minimum distance and, with respect to the swirl flow, downstream of the restriction, the inclination decreasing continuously until the area of maximum distance is reached.

DESCRIPTION OF THE PRIOR ART

Ever stricter demands on fuel consumption and exhaust emissions, in particular the reduction of hydrocarbon emission, necessitate the use of new technologies for internal combustion engines. With modern systems of external mixture formation employed in engines of the spark-ignition type, such as injection by means of a suction pipe or the use of a carburetor, part of the mixture admitted into the combustion chamber and cylinder flows into the exhaust passage of the engine during the phase of valve overlap, i.e., when intake and outlet valve are open simultaneously. Besides, a considerable percentage of the unburnt hydrocarbons found in the exhaust passage originates from parts of the mixture coming from annular gaps or wall areas where no combustion occurs. An additional point is the need for rendering the cylinder charge homogeneous, at an approximately stoichiometric fuel-air ratio, to ensure reliable combustion without misfiring. For this purpose the engine load must be controlled with the use of a throttling device checking the total volume of the admitted mixture (quantity control).

Throttling the intake flow leads to a thermodynamic loss, which will increase the fuel consumption of the engine. If such throttling is avoided, the potential fuel savings amount to an estimated 20 percent.

To avoid or reduce the above disadvantages numerous attempts have been made at an unthrottled operation of spark-ignition engines, where the fuel is introduced into the combustion chamber and cylinder or a mixing space directly adjacent thereto only after the air has been admitted, similar to a compression-ignition engine.

Basically, there are three systems of mixture formation:
— high-pressure injection of liquid fuel
— air-supported fuel injection
— injection of a fuel-air mixture.

In SAE 780699 a method is described in which the fuel is directly, injected into the engine combustion chamber by means of a high-pressure injection nozzle. The time required for preparation of the mixture puts a restriction on the minimum time lapse between point of injection and point of ignition. The injection process demands a high level of pressure to obtain short injection times as well as satisfactory fuel atomization with a suitably small droplet spectrum. Fuel preparation and metering take place simultaneously. In order to concentrate the combustible fuel-air mixture within a locally confined region, however, it is essential that the fuel be introduced at a very late point in time of the engine cycle (if necessary, as late as during the compression phase immediately prior to ignition), to limit the time for propagation and dilution of the mixture in the air of the combustion chamber. The demands for an early injection ensuring complete evaporation of the fuel and a late injection in order to maintain mixture stratification thus are opposed to each other. Further development efforts must therefore be aimed at reducing the characteristic time required for mixture preparation while increasing the characteristic time during which the desired mixture stratification is maintained.

In WO 88/08082 a method of air-supported introduction of fuel into the combustion chamber and cylinder of an internal combustion engine is described. The compressed air is generated externally, i.e., outside of the combustion chamber, and is used to introduce the fuel during the compression phase of the engine. The injection time is determined by the gas pressure of the external air supply, as a difference in pressure is needed between injection equipment and combustion chamber during the injection process. Fuel metering takes place separately from the air-supported preparation. By using different gas pressures for the external supply of compressed air, the geometry of the fuel jet may be varied.

In EP 0 328 602 B1 a device for introducing fuel into the combustion chamber and cylinder of an internal combustion engine is disclosed, in which an injection valve and a mixing chamber are provided for withdrawing compressed gas from the cylinder space and injecting a fuel-air mixture into the cylinder space during the subsequent working cycle. By utilizing the pressure in the cylinder as storage pressure the time of injection may be chosen as desired. Fuel preparation (evaporation) and fuel metering are separate processes, the former taking place mainly in the storage cell, by atomization and pre-evaporation prior to the actual introduction into the combustion chamber and cylinder. The process includes the following steps;

— timed withdrawal of a small amount of compressed hot gas via a valve opening into the combustion chamber of the cylinder;

— storage of the compressed hot gas in a mixing chamber;

— injection of fuel into the compressed hot gas in the mixing chamber;

— injection of the stored fuel-air mixture by means of the valve opening into the cylinder.

Due to the mixture preparation in the above mixing chamber a jet of the fuel-air mixture will enter the combustion chamber during the injection process, whose air ratio is significantly sub-stoichiometric (i.e., lambda<0.3). The characteristic time required for mixture preparation is significantly reduced. In the instance of liquid fuel injection under high pressure, a similarly shaped spraycloud of finely atomized, evaporating droplets will enter the combustion chamber.

The liquid fuel or fuel-air jet injected must be transformed into a locally concentrated spraycloud, which must be advanced from the nozzle of the injection valve to the spark plug; the mixture confined within this cloud must further be mixed with the air in the combustion chamber. In this context the following points are essential:

(a) The fuel-air spray should maintain its compact shape, in particular, at low engine loads, and should be kept in the centre of the combustion chamber as far as possible, for thermodynamical reasons and in order to reduce the emissions of unburnt hydrocarbons.

(b) Dilution of the injected fuel-air mixture to a preferably stoichiometric air ratio must be effected in the comparatively short time span between injection point and ignition point.

(c) At the spark plug a low mean flow velocity should prevail, together with a high level of turbulence, to promote ignition of the fuel-air spray by the spark.

One main problem of this type of combustion is constituted by the cyclical fluctuations of the process of mixture formation, i.e., changes between engine cycles due to the turbulence of the flow processes in the intake system and cylinder of the internal combustion engine. To minimize such fluctuations a type of flow should be generated in the cylinder which features high stability and will retain its pattern, in particular during the compression phase of the engine cycle, without disintegrating into turbulent flow movements. This requirement is best fulfilled by a swirl flow.

The term swirl denotes a rotary motion in the cylinder about an axis that is substantially parallel to the cylinder axis, which motion is generated by the design of the inlet passage(s) and corresponding opening(s) into the combustion chamber and cylinder of the engine. During compression the flow pattern changes only slightly since the movement of the piston does not change the diameter of the vortex. In this way a stable rotary movement of the admitted air is provided the combustion chamber and cylinder before upper dead centre.

The present invention intends to transform the stable swirl flow by means of the shape of the piston top bounding the combustion chamber and to position the injection device in the combustion chamber in such a way that the above effects on the fuel-air spray are achieved.

In EP 0 398 941 A1 a type of piston recess is disclosed which, if designed appropriately, will deflect the flow of the swirl rotating about the cylinder axis in the direction of the cylinder axis during the compression phase. This is achieved by dividing the recess into two or three parts. The restricted portions of the sidewall between the concave parts of the recess will deflect the swirl flow towards the centre of the cylinder as it enters the recess during the compression phase, such that the level of turbulence will increase significantly in the centre of the piston recess due to the collision of the streams located opposite of each other and directed towards the cylinder centre. With this kind of piston recess additional turbulence is produced due to burbling at the edges of the recess when the swirl flow enters the recess. At the same time a low mean flow velocity is obtained in the centre area of the combustion chamber due to the rotation-symmetrical design.

In the above EP 0 598 941 A1 this production of turbulence is the only means of accelerating the combustion of lean mixtures and the evaporation of fuel films on the walls of the combustion chamber.

In SAE 890211 another type of combustion chamber of an internal combustion engine as described in the opening paragraph of this paper is disclosed, i.e., the so-called Nebula chamber, in which high charge turbulences may be generated during the combustion process at the time of ignition. In the Nebula chamber the turbulences are produced by two streams which are directed towards the cylinder centre in the same sense of rotation. Up to an air ratio of lambda=1.6 satisfactory lean operation is possible with gaseous fuels.

SUMMARY OF THE INVENTION

It is an object of the invention to further develop an internal combustion engine as described above, and, if possible, to obtain complete combustion of the liquid or vaporized fuel directly introduced into the combustion chamber, reducing both fuel consumption and exhaust emissions.

In the invention this is achieved by placing the fuel delivery device in an eccentric position relative to the centre of the combustion chamber, from where the fuel may be introduced in a direction which is preferably inclined relative to the axis of the combustion chamber, and by locating the ignition device approximately in the centre of the combustion chamber, and by providing the restrictions of the piston recess with guide faces located approximately parallel to the axis of the combustion chamber and directed towards the centre of the combustion chamber, whose smallest distance from the centre of the combustion chamber is 0–0.2 times the piston diameter. During the intake phase of the engine the inlet passage, which is configured so as to produce at least one swirl, will generate a main swirl rotating about the longitudinal axis of the cylinder. Upon entering the piston recess during the compression phase this swirl is divided into secondary swirls or vortexes rotating in the same direction, whose number corresponds to the number of partial combustion chambers. Into at least one of these vortexes fuel or a fuel-air mixture is injected during the compression phase. The injected mixture is confined within a vortex to form a locally concentrated, stable spraycloud. The shaping of the combustion chamber proposed by the invention will result in a zone of increased turbulence production in the centre of the combustion chamber, which will permit rapid preparation of the fuel-air spray to yield an ignitable mixture. In the area of the centrally positioned spark plug a low mean velocity will prevail, together with a high turbulence intensity, on account of the flow which is symmetrical to the centre of the combustion chamber, which will promote inflammation of the mixture.

In order to avoid too large a distance between the fuel-air spray and the spark plug in the direction of the cylinder axis, it is recommended that the bottom of the piston recess be flat.

The best results, have been obtained by means of a ratio of depth to maximum distance between 0.3 and 0.6, and a substantially flat bottom of the piston recess, at least in the area of the maximum distance.

In order to generate a compact spraycloud it is of advantage if the ratio between the distance of the nozzle of the fuel delivery device from the centre of the combustion chamber and the piston diameter is 0.1 to 0.4, approximately. The mixture is efficiently kept together and rapidly advanced to the centre of the combustion chamber if the straight line connecting the nozzle of the fuel delivery device and the centre of the combustion chamber is at an angle of −30° to 60° to a plane normal to the guide faces and going through the axis of the combustion chamber, the angle being defined positive in the direction of rotation of the swirl. It is preferably provided that the symmetry axis of the fuel delivery device form an angle of about 30° to 85° with a plane normal to the axis of the combustion chamber.

To promote rapid combustion of the mixture the distance of the ignition deice from the centre of the combustion chamber should not exceed a value 0.1 times the piston diameter. Outside of this range there would be the danger of spark failure due to higher mean flow velocities.

In order to prevent burbling of the charge flow upon entering the piston recess, it is provided that the edges of the partial combustion chambers on the inlet end be given a rounded profile enhancing good flow characteristics.

It is a special advantage if the curvature of the walls of each partial chamber increases in flow direction, as viewed from above. This will lead to a high turbulence in the centre of the combustion chamber and encourage the formation of separate secondary swirls.

The fuel delivery device may be configured as an injection valve for both fuel-air and airless injection, the jet produced by the fuel delivery device preferably being shaped conically.

BRIEF DESCRIPTION OF THE DRAWINGS

The invention will be further described with reference to the accompanying drawings, in which

FIG. 2 is a plan view of the piston in FIG. 1.

FIG. 2a is a section along line IIa—IIa in FIG 2.

FIG. 2b is a section along line IIb—IIb in FIG. 2.

FIG. 2c is a section along line IIc—IIc in FIG. 2.

FIG. 2d is a plan view of another variant of the intention, featuring three partial chambers.

DESCRIPTION OF THE PREFERRED EMBODIMENTS

Figure 1:
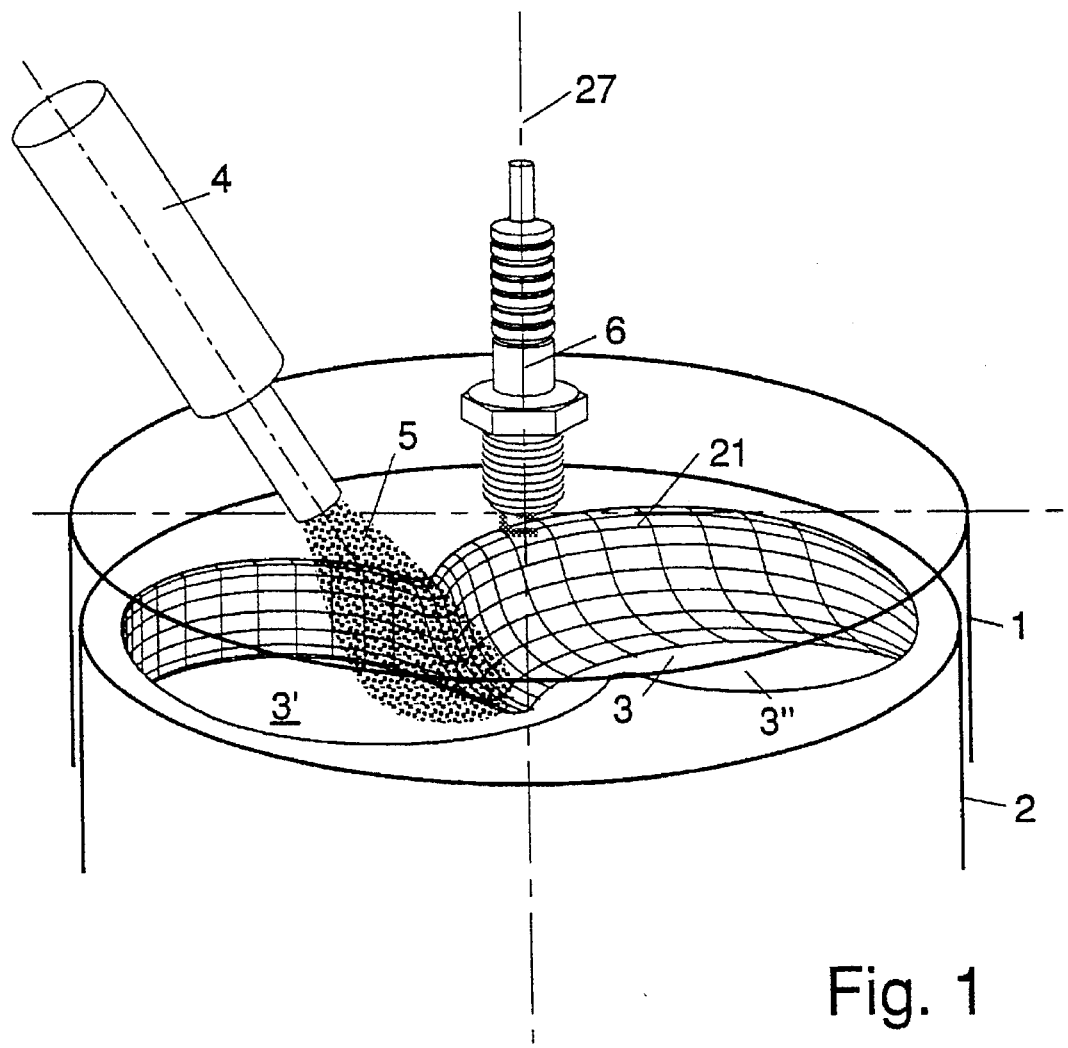
FIG. 1 is a schematic oblique view of a combustion chamber of an internal combustion engine of the present invention, in a variant featuring two partial chambers.
Figure 3:
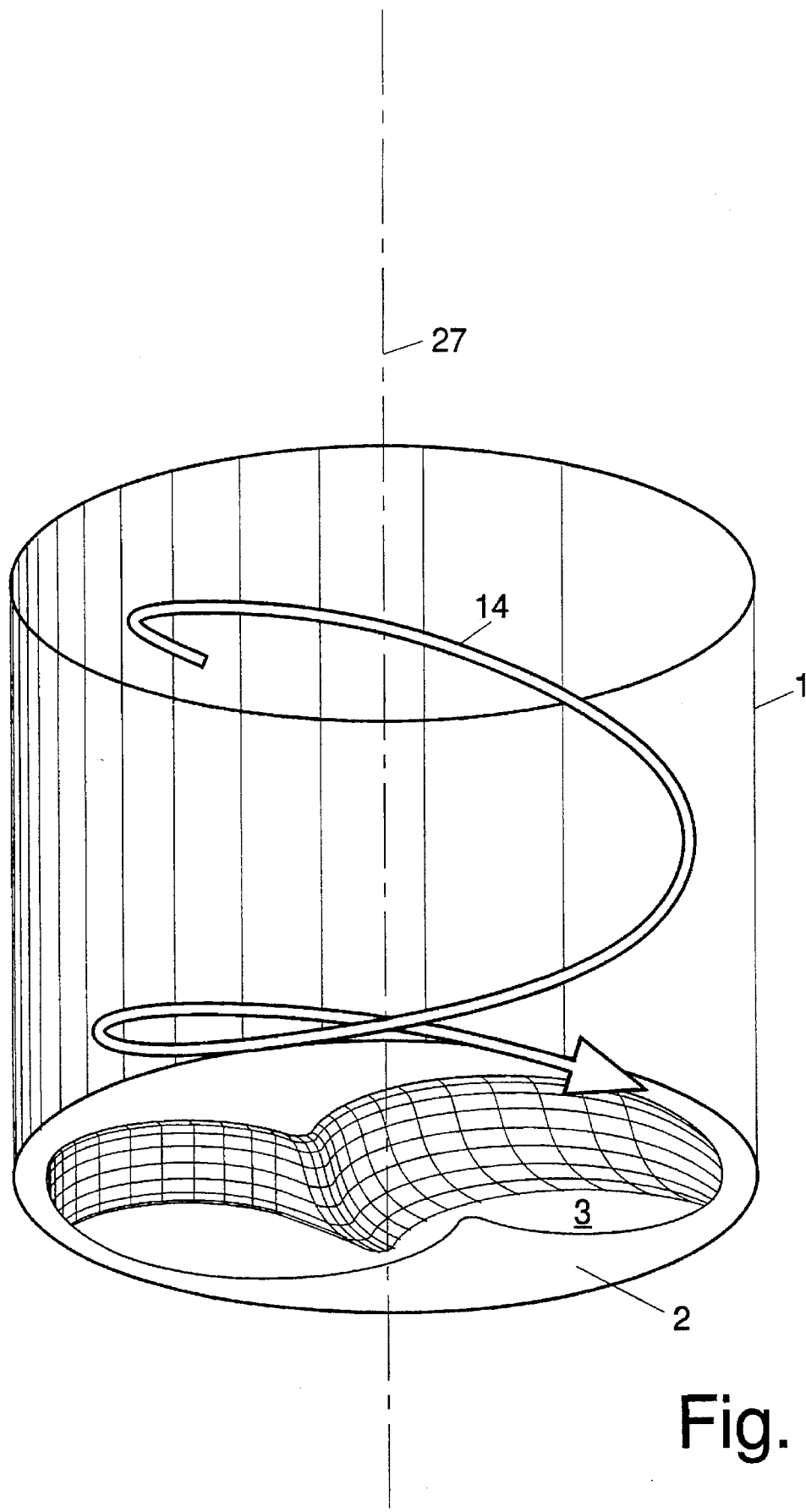
FIG. 3 is another oblique view of the combustion chamber.
Figure 4A:
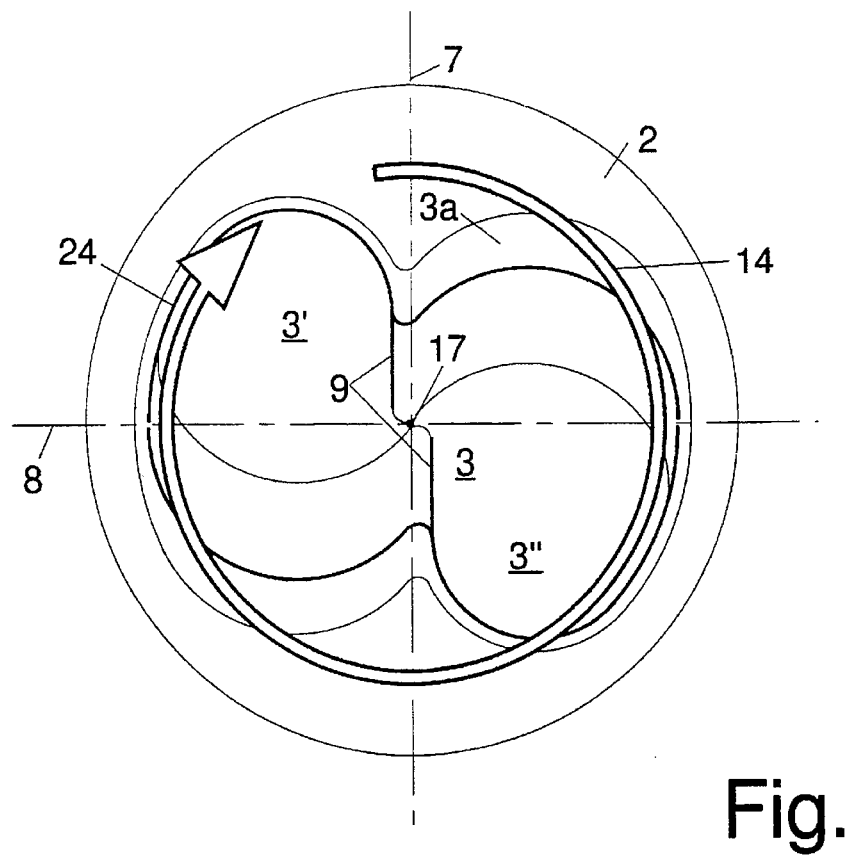
FIGS. 4a and 4b are plan views of the combustion chamber with different types of flow.
Figure 4B:
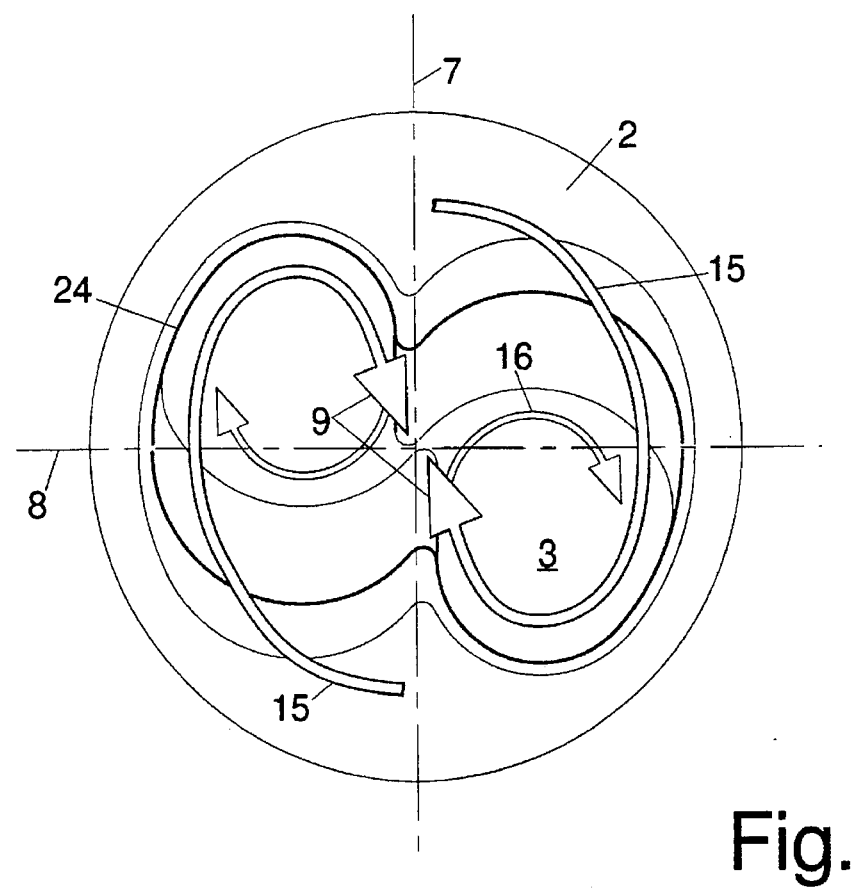

Referring to FIG. 1, the piston 2 reciprocating in a cylinder 1 has a recess 3 forming the combustion chamber. By restrictions 23 of its sidewall the combustion chamber is divided into partial chambers 3', 3". By means of the fuel delivery device 4 fuel 5 is blown in or injected into a partial chamber 3'. In the centre of the combustion chamber an igniting device 6 is positioned. If the recess 3 is suitably designed, in particular, if the guide faces 9 incorporated in the restrictions 23 are displaced laterally at 10 (FIG 2) vis-a-vis the reference axis 7 parallel to the guide faces 9, the swirl 14 (FIG. 3) may be divided into a number of vortexes or secondary swirls 15 corresponding to the number of partial chambers of the recess 3, by entering the recess during the compression phase at 3a. The lateral displacement 10 is in a range of 0 to 0.2 of the piston diameter D. The secondary swirls 15 are quite stable, especially near the bottom 16 of the recess 3, due to their being almost completely enclosed by the recess walls 24. Towards the top of the recess 3 the minimum distance 11 of the restrictions 23 is large enough to induce a burble of the secondary swirl streams 15 at the guide faces 9, thus provoking a collision of opposed streams and subsequent turbulence in the upper area of the centre 17 of the combustion chamber. In order to limit the increased turbulence to the combustion centre 17, those edges 21 at the entrance 3a of the piston recess 3 which are passed by the swirl flow 14 upon entering the recess 3, are provided with a rounded profile preventing burbling and the production of turbulences in these areas. As the main swirl 14 (FIG. 4a) is divided into secondary swirls 15, 16 (FIG. 4b, FIG. 5) the rotational speed will increase due to the diminishing swirl diameter (conservation of torque), thereby increasing the influence of the swirl movement on an injected spraycloud.

Figure 6A:
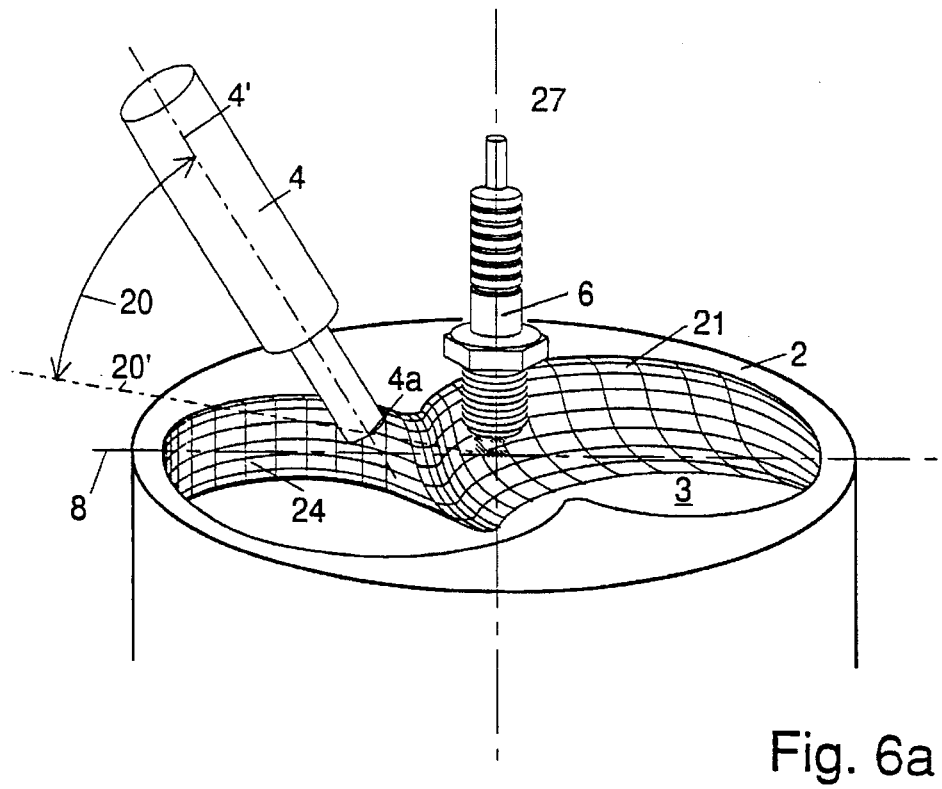
FIG. 6a is another oblique view of the combustion chamber.
Figure 6B:
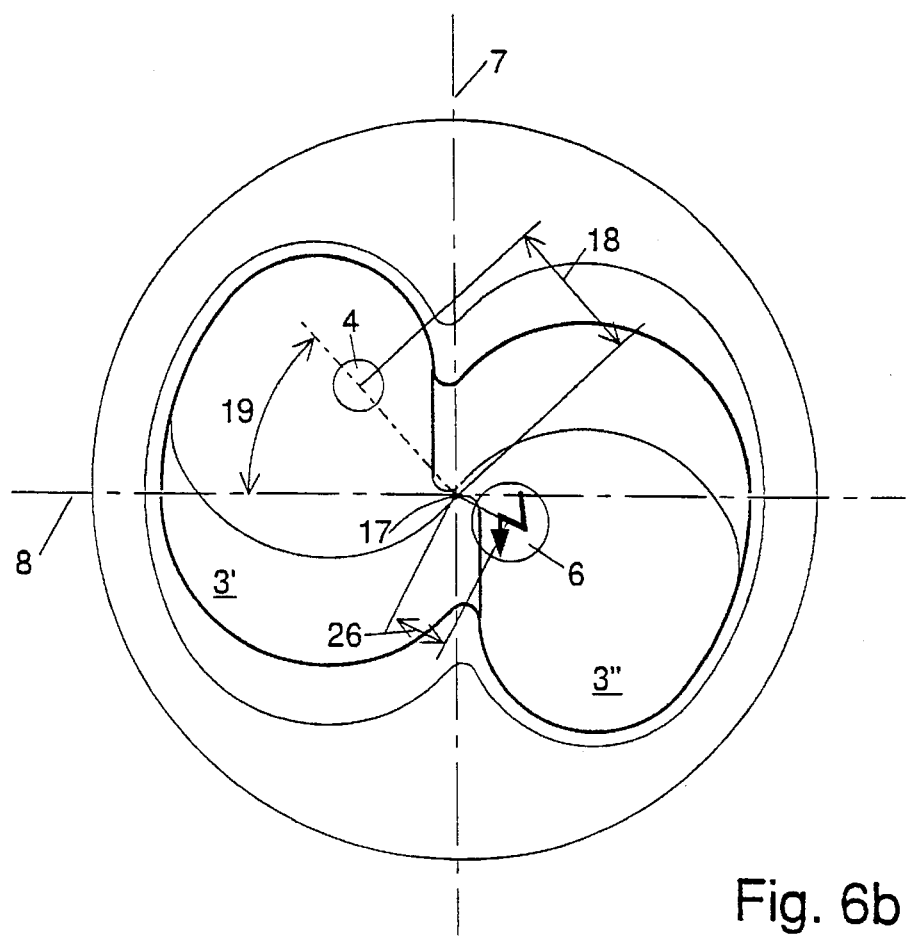
FIG. 6b is a plan view of the combustion chamber with schematically drawn fuel delivery and ignition devices.

At low engine loads and small fuel-air volumes requiring particularly strong stratification of the fuel-air mixture in the combustion chamber, the mixture is preferably injected at a very late point during the compression phase. At this point most of the cylinder charge will be found in the piston recess 3, i.e., the movement imparted to the flow by the shape of the recess will be predominant in the volume of the combustion chamber. The fuel delivery device 4, i.e., an injection device, is positioned such that the injected fuel or fuel-air jet is directed from the position of the fuel delivery device 4 eccentric to the axis 27 of the combustion chamber, towards the axis 27 of the combustion chamber, and will thus arrive at the piston recess 3 serving as combustion chamber. The position of the fuel delivery device 4 vis-a-vis the piston recess 3 is such that the fuel or fuel-air mixture is injected only into one of the secondary swirls 15 formed in the recess 3. The position of the fuel delivery device 4 is defined by the radial distance 18 and the angle 19 relative to the reference axis 8 of the piston recess 3 and by the angle 20 of the centre axis of the fuel delivery device 4 relative to the plane formed by the reference axes 7, 8 of the piston recess 3. The radial distance 18 should not be smaller than 0.1 D and not larger than 0.4 D, D being the diameter of the piston 2. The angle 19 should be between −30° and 60°. The angle 19 is defined positive in the direction of rotation of the secondary swirl 15. The angle 20 should assume values between 30° and 85° (FIGS. 6a, 6b).

The spark plug 6 should be positioned in the centre 17 of the combustion chamber, its maximum eccentricity 26 relative to the cylinder axis being 0.1 D.

Figure 7:
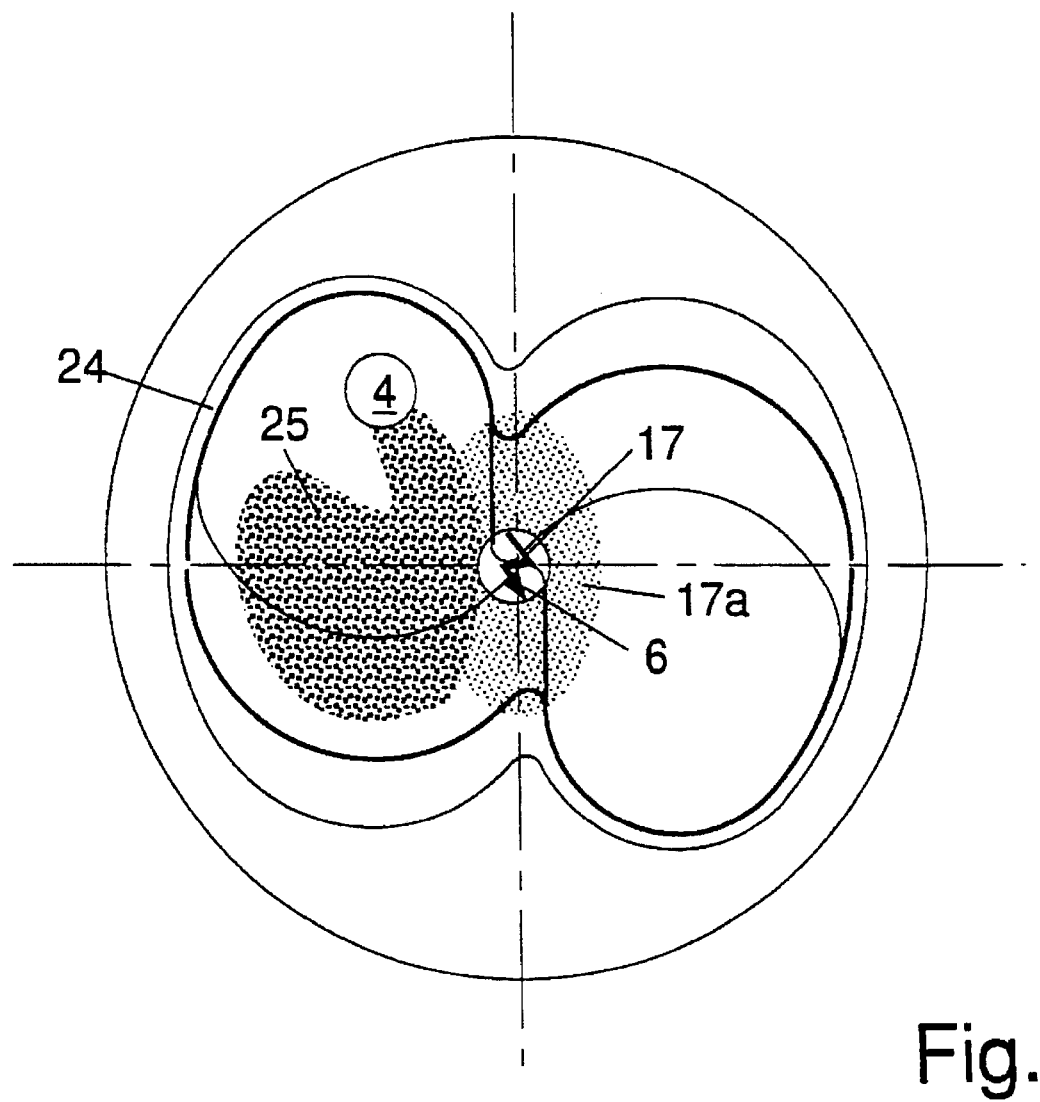
FIG. 7 is another plan view of the combustion chamber showing turbulence and mixing zones.

The injected fuel or fuel-air jet 5 entering the combustion chamber is deflected by the motion of the secondary swirl and transformed into a spraycloud 25 (FIG. 7). In the bottom area of the piston recess 3 the mixture is rolled into the secondary swirl 15 confined by the walls of the recess. In the upper area of the recess some of the fuel is caught in the colliding streams and thus the central zone of increased turbulence production. To prevent too large a distance between the spraycloud 25 and the spark plug 6 in the direction of the axis 27 of the combustion chamber, the piston recess 3 should be shallow. The maximum distance 13 of the wall 24 of the recess 3 from the centre 17 of the combustion chamber should equal the maximum distance obtainable in the piston top 2', which is defined by the piston rings, and should amount to not less than 0.3 D at the upper edge (FIG. 2a). The depth 12 of the piston recess 3 should be in the ration of 0.3 to 0.6 to the maximum distance 13. The minimum distance 11 of the wall 24 of the recess 3 is found in the area of the restrictions 23 and amounts to 0.2 to 0.5 times the maximum distance 13 (FIG. 2b), as measured in a plane 2" directly below the piston top 2'. This will also apply to combustion chambers 3 with more than two partial chambers, for example, with three partial chambers 3', 3", 3"', as is shown in FIG. 2d.

Introducing the fuel as proposed by the invention will serve two main purposes.

(1) Since the two secondary swirls 15 represent stable flow structures and there is only little gas exchange between the two secondary swirls 15 in the centre 17 of the combustion chamber despite the turbulence produced in this zone, the amount of air participating in further diluting the mixture is thus reduced.

Figure 5:
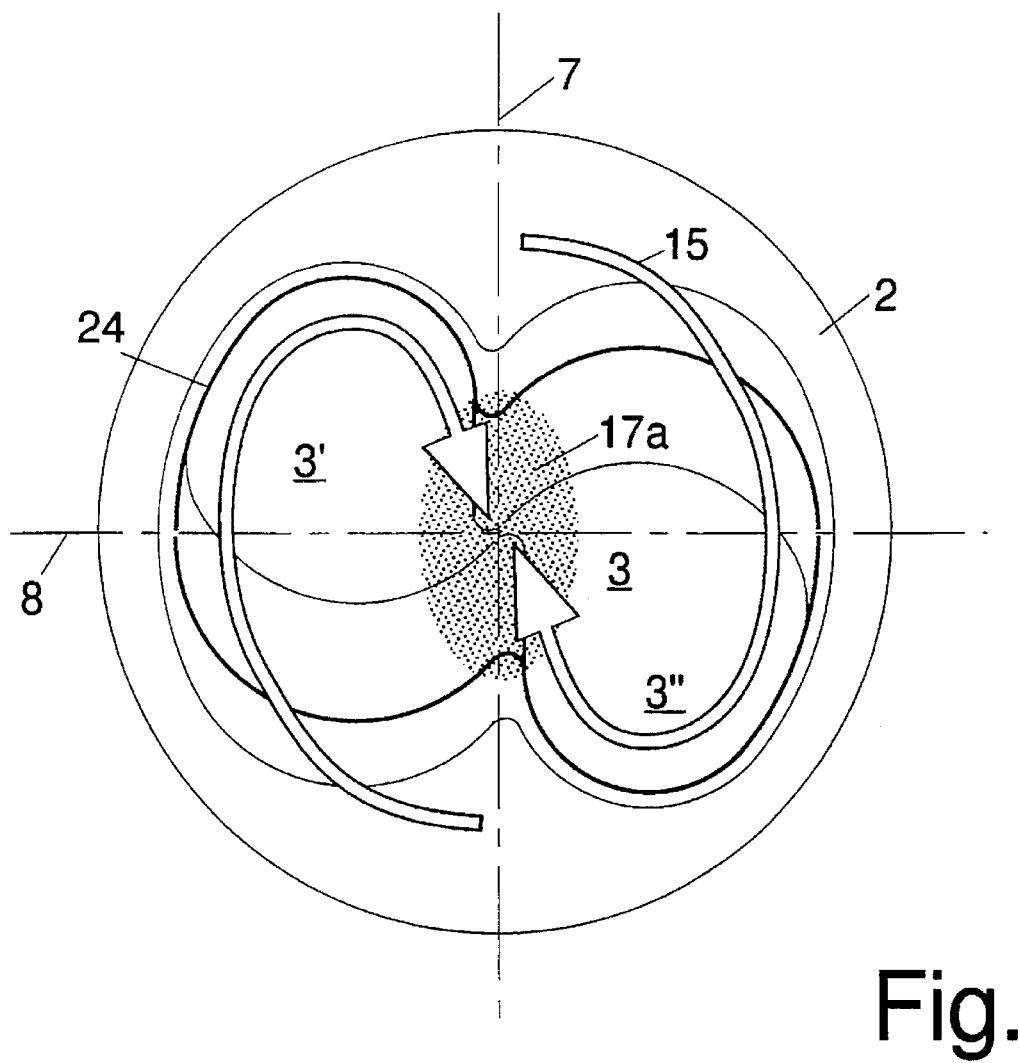
FIG. 5 is another plan view of a combustion chamber.

(2) Parts of the preferably conical fuel-air jet 5 injected and the peripheral regions of the spraycloud 25 contained in one of the secondary swirls 15 are advanced into the zone of increased turbulence 17a forming in the centre of the combustion chamber (FIG. 5). This will ensure rapid preparation of the injected mixture, which is significantly substoichiometric, transforming it into an ignitable, preferably stoichiometric mixture in direct proximity of the spark plug 6 located in the centre 17 of the combustion chamber, at the same time improving the conditions of ignition (increased turbulence, low mean velocity). Thus all requirements necessary for implementation of the intended combustion process are fulfilled:

—The injected fuel-air mixture is confined inside a secondary swirl 15 as a compact and stable spraycloud 25 (FIG. 7).

—In the zone of increased turbulence production in the centre 17 of the combustion chamber accelerated preparation takes place to produce an ignitable mixture.

—In the area of the centrally located spark plug 6 the flow movement symmetrical to the centre 17 of the combustion chamber leads to a low mean velocity accompanied by high turbulence intensity, thus promoting inflammation of the mixture.

The combustion process to be implemented with the use of the internal combustion engine of the invention includes the following sequence of steps:

(1) Generation of a swirl about the longitudinal cylinder axis during the intake phase of the engine cycle.

(2) Division of the swirl into two or three secondary swirls rotating in the same direction during the compression phase, by the appropriate design of a recess in the piston.

(3) Injection of fuel or a fuel-air mixture into one of the secondary swirls during the compression phase.

(4) Formation of a locally concentrated, compact spray of the fuel-air mixture within the secondary swirl.

(5) Formation of a locally confined zone of increased turbulence intensity accompanied by accelerated mixture preparation in the central upper area of the combustion chamber.

(6) Optimum conditions for ignition of the fuel-air spray by providing an ignitable mixture at high turbulence intensity and low mean velocity at the spark plug.

We claim:

1. An internal combustion engine with spark ignition comprising at least one reciprocating piston having a piston head and a longitudinal axis and a combustion chamber substantially located in the piston, said combustion chamber having a bottom, a wall and a central axis in its centre being parallel to said longitudinal axis of said piston, whereby there are edges between said wall and said piston head, with at least one fuel delivery device per cylinder for direct introduction of fuel into said combustion chamber, said combustion chamber being divided into at least two partial chambers by restrictions extending to said bottom of said combustion chamber, said partial chambers being shaped asymmetrically as seen from above and being arranged rotation-symmetrically relative to said central axis of said combustion chamber, with a minimum distance at said restrictions of said wall of said combustion chamber and a maximum distance in concave-shaped areas of said wall of said combustion chamber, measured in a cutting plane directly below said piston head, departing from said central axis of said combustion chamber, wherein the ratio between said minimum distance and said maximum distance being at least 0.2 and at most 0.5, and said wall of each partial combustion chamber being inclined relative to said longitudinal axis of the piston in the area of said minimum distance and, with respect to the swirl flow, downstream of the restriction, said inclination decreasing continuously until the area of maximum distance is reached, wherein said fuel delivery device is placed in an eccentric position relative to said centre of said combustion chamber, from where said fuel may be introduced in a direction, which is inclined relative to said central axis of said combustion chamber, and wherein said ignition device is located approximately in said centre of said combustion chamber, and wherein said restrictions are provided with guide faces located approximately parallel to said central axis of said combustion chamber and directed towards said centre of said combustion chamber, whose smallest distance from said centre of said combustion chamber is 0–0.2 times the piston diameter.

2. An internal combustion engine according to claim 1, wherein the ratio of the depth of said combustion chamber to the maximum distance is between 0.3 and 0.6.

3. An internal combustion engine according to claim 1, wherein the ratio between the distance of a nozzle of said fuel delivery device from said centre of said combustion chamber and the piston diameter is about 0.1 to 0.4.

4. An internal combustion engine according to claim 1, wherein a straight line connecting a nozzle of said fuel delivery device and said centre of said combustion chamber is at an angle of −30° to 60° to a plane normal to said guide faces and going through said central axis of said combustion chamber, said angle being defined positive in the direction of rotation of a swirl.

5. An internal combustion engine according to claim 1, wherein a symmetry axis of said fuel delivery device forms an angle of about 30° to 85° with a plane normal to said central axis of said combustion chamber.

6. An internal combustion engine according to claim 1, wherein the distance of said ignition device from said centre of said combustion chamber does not exceed a value 0.1 times the piston diameter.

7. An internal combustion engine according to claim 1, wherein said edges on an inlet end of said partial combustion chambers are provided with a rounded profile enhancing good flow characteristics.

8. An internal combustion engine according to claim 1, wherein the curvature of said walls of each partial chamber increases in flow direction, as viewed from above.

9. An internal combustion engine according to claim 1, wherein the jet produced by said fuel delivery device is conically shaped.

10. An internal combustion engine according to claim 1, wherein said fuel delivery device is configured as an injection valve for injection of a fuel-air mixture.

11. An internal combustion engine according to claim 1, wherein said fuel delivery device is configured as an injection valve for airless fuel injection.

12. An internal combustion engine according to claim 1, wherein said bottom of said piston recess is substantially flat, at least in the area of said maximum distance.

* * * * *